(12) United States Patent
Luedders et al.

(10) Patent No.: US 10,843,809 B2
(45) Date of Patent: Nov. 24, 2020

(54) FUEL CELL SYSTEM FOR AN AIRCRAFT AND METHOD FOR PROVIDING AN INERT GAS IN AN AIRCRAFT

(71) Applicant: Airbus Operations GmbH, Hamburg (DE)

(72) Inventors: Hauke-Peer Luedders, Hamburg (DE); Sijmen Zandstra, Hamburg (DE); Alexander Fabritz, Hamburg (DE)

(73) Assignee: Airbus Operations GmbH (DE)

( * ) Notice: Subject to any disclaimer, the term of this patent is extended or adjusted under 35 U.S.C. 154(b) by 1161 days.

(21) Appl. No.: 14/984,723

(22) Filed: Dec. 30, 2015

(65) Prior Publication Data

US 2016/0200447 A1 Jul. 14, 2016

(30) Foreign Application Priority Data

Jan. 8, 2015 (DE) .................. 10 2015 100 185

(51) Int. Cl.
*B64D 37/32* (2006.01)
*H01M 8/04082* (2016.01)
(Continued)

(52) U.S. Cl.
CPC ........... *B64D 37/32* (2013.01); *B64D 41/007* (2013.01); *H01M 8/04201* (2013.01);
(Continued)

(58) Field of Classification Search
CPC ................ B64D 37/32; B64D 41/007; B64D 2041/005; B64D 2037/325;
(Continued)

(56) References Cited

U.S. PATENT DOCUMENTS 8,192,882 B2 * 6/2012 Stolte .................... B64D 41/00
429/434
8,484,962 B2 7/2013 Behr et al.
(Continued)

FOREIGN PATENT DOCUMENTS

DE 102005010399 A1 9/2006
DE 102005012120 A1 9/2006
(Continued)

OTHER PUBLICATIONS

English Translation of JP09-125465.*
(Continued)

*Primary Examiner* — Milton I Cano
*Assistant Examiner* — Kiran Akhtar
(74) *Attorney, Agent, or Firm* — Lerner, David, Littenberg, Krumholz & Mentlik, LLP

(57) ABSTRACT

A fuel cell system for an aircraft includes at least one fuel cell having a first inlet for providing a fuel, a second inlet for providing an oxidant, an outlet for removing exhaust air and a voltage outlet, an electrically operable hydraulic pump, which is integratable into a hydraulics network of the aircraft and connectable to the voltage outlet of the at least one fuel cell and a controllable hydraulic energy converter with changeable operating behaviour. The hydraulic energy converter is adapted for generating such a power demand in the hydraulics network, that the at least one fuel cell provides a predetermined volume flow of oxygen depleted air at the outlet through delivering electrical power to the hydraulic pump.

14 Claims, 2 Drawing Sheets

(51) Int. Cl.
*B64D 41/00* (2006.01)
*H01M 8/04746* (2016.01)

(52) U.S. Cl.
CPC .... *H01M 8/04761* (2013.01); *H01M 2250/20* (2013.01); *Y02T 90/32* (2013.01)

(58) Field of Classification Search
CPC ......... H01M 8/04201; H01M 8/04761; H01M 2250/20; Y02T 90/32; B64C 13/00; B64C 19/00; B64C 3/18; B64C 13/16; B64C 17/00; B64C 3/36; E03B 5/00; F16K 31/44; F04B 49/00; F15B 11/08; F16D 31/02
See application file for complete search history.

(56) References Cited

U.S. PATENT DOCUMENTS

| | | | |
|---|---|---|---|
| 8,623,566 | B2 | 1/2014 | Westenberger et al. |
| 2007/0026268 | A1 | 2/2007 | Metzler et al. |
| 2008/0210812 | A1* | 9/2008 | Gans ................ B64D 41/007 244/58 |
| 2009/0202370 | A1 | 8/2009 | Fujii et al. |
| 2010/0221642 | A1 | 9/2010 | Frahm et al. |
| 2012/0161512 | A1* | 6/2012 | Metzler ............. B64D 41/00 307/9.1 |
| 2012/0318921 | A1 | 12/2012 | Rohrbach et al. |

FOREIGN PATENT DOCUMENTS

| | | | |
|---|---|---|---|
| DE | 102007017820 A1 | 8/2008 | |
| DE | 10 2008 006 742 A1 | 8/2009 | |
| DE | 102009054886 A1 | 6/2011 | |
| EP | 0957026 A2 | 11/1999 | |
| EP | 2160323 B1 | 2/2013 | |
| EP | 2 624 353 A1 | 8/2013 | |
| EP | 2 712 013 A1 | 3/2014 | |
| JP | 09-125465 | * 5/1997 | ................ E02F 9/22 |

OTHER PUBLICATIONS

Extended European Search Report EP 15202435.2 (dated Apr. 28, 2016).

German Search Report (dated Nov. 6, 2015) (10 2015 100 185.3 DE).

* cited by examiner

FUEL CELL SYSTEM FOR AN AIRCRAFT AND METHOD FOR PROVIDING AN INERT GAS IN AN AIRCRAFT

FIELD OF THE INVENTION

The invention relates to a fuel cell system for an aircraft, a method for providing an inert gas in an aircraft, along with an aircraft, which comprises such a fuel cell system.

BACKGROUND OF THE INVENTION

Known in prior art are various inerting and fire extinguishing systems for aircraft, which use the gas halon, which will in the future no longer be permitted, or oxygen-depleted exhaust gas from the operation of fuel cell systems. In particular when using a fuel cell-based system, its continuous operation must be ensured, since the fuel cell process may be performed, and thus oxygen-depleted air be produced, only if sufficient electrical power is tapped.

Known from prior art is to feed the electrical power provided by the fuel cell system into a voltage supply network, which taps this power.

Known from DE 10 2005 010 399 B4 are an aircraft with a fuel cell emergency system and a method for air-independent emergency power supply. DE 10 2008 006 742 A1 shows a fuel cell system for an aircraft that comprises a fuel cell with an oxidant inlet for supplying an oxygenic medium into the fuel cell, which may be connected with an exhaust gas outlet of a cabin in the aircraft.

BRIEF SUMMARY OF THE INVENTION

During proper operation of the aircraft, the power required for electrical devices is supplied by engine-driven generators. However, should it become necessary in this state to provide oxygen-depleted air and/or water with the assistance of a fuel cell system, there is no demand on the part of the voltage supply network for additional electrical power. Therefore, in order to operate the fuel cell system, an electrical energy converter, for example a heater, would have to be used to remove the electrical power. However, the problem here is that the resultant heat must also be removed.

Therefore, the aspect of the invention may provide a fuel cell system that, if needed, may provide larger quantities of inert gas in the quality required and/or water, without an electrical load itself converting just the electrical power provided by the fuel cell into heat and comprehensive measures being required to remove the resultant heat for this purpose.

Proposed is a fuel cell system for an aircraft, which comprises at least one fuel cell with a first inlet for supplying a fuel, a second inlet for supplying an oxidant, an outlet for removing exhaust air, and a voltage output. The fuel cell system further comprises an electrically drivable hydraulic pump, which is integratable into a hydraulic network of the aircraft, and is connectable with the voltage output of the fuel cell. Also provided is a controllable hydraulic energy converter with variable operating behavior, which is integratable between a high-pressure line and a low-pressure line of the hydraulic network. The hydraulic energy converter is set up to generate the type of power demand in the hydraulic network that the fuel cell dispenses electrical power to the hydraulic pump to provide a prescribed volume flow of oxygen-depleted exhaust air to the outlet.

The term "at least one fuel cell" must be understood to mean that both individual fuel cells and a group of fuel cells may be used in the fuel cell system according to an embodiment of the invention. A group of fuel cells may be comprised of individual fuel cells connected with each other in parallel or serially, or take the form of fuel cell stacks (fuel cell stacks). In the latter case, shared inlets and lines for supplying and distributing fuel and oxidants may be used, which simultaneously facilitates shared cooling. In addition, the operation of several fuel cell stacks one next to the other may also not be ruled out.

For example, the first inlet for supplying a fuel may be connected with an anode side of the at least one fuel cell, and absorb water, which is guided on the anode of the at least one fuel cell. The second outlet may be supplied with air as the oxidant, which stemmed from the environment of the fuel cell, an exhaust air line from the cabin of the aircraft, a recirculation line or an exhaust gas line of monuments inside of the aircraft fuselage. The oxidant is guided on the cathode side of the at least one fuel cell, which is separated from the anode side by an electrolyte. After the fuel and oxidant have been supplied, the provided electrical power is tapped to generate oxygen-depleted air on the cathode side, which then exits the at least one fuel cell through the outlet.

The electrically drivable hydraulic pump may be designed as an additional, separate pump, which is electrically connected with the at least one fuel cell, and is then only operated when the fuel cell system is in operation. This eliminates the need for having to separate an already present hydraulic pump from an electrical network, and instead utilize the at least one fuel cell as its power supply, and following its operation, couple the hydraulic pump with the respective electrical network once more. However, it may also make sense to use an electrically drivable hydraulic pump that is already present in a hydraulic system.

In order to electrically operate the hydraulic pump, the latter comprises an electric motor, which may be a direct current motor or an alternating current motor. Since the fuel cell delivers a DC voltage, utilizing an alternating current motor may require an inverter, which is placed between the at least one fuel cell and electric motor.

The hydraulic pump may be an axial piston pump with swash plate, a vane pump, a gear pump, a screw spindle pump or a radial piston pump, with the axial piston pump in particular being suitable.

The swash plate may comprise a constant or variable angle.

A core idea of the invention involves using a hydraulic energy converter, which is arranged between a high-pressure side and low-pressure side of the hydraulic network, and does not perform any appreciable mechanical work. Rather, the percentage of hydraulic liquid flowing through the energy converter is heated, and cooled by corresponding coolers of the hydraulic network, or just by convection between the corresponding hydraulic lines and their respective environment. As a consequence, the realizable performance losses here lead to a high power output by the hydraulic pump, which in turn leads to a high electrical power output of the at least one fuel cell. This makes it possible to ensure the production of oxygen-depleted exhaust air and/or of water.

The hydraulic energy converter is provided to absorb hydraulic power and generate only a negligible amount of mechanical power, or none at all, so that the hydraulic power is primarily converted into heat. The exhaust heat heats up the hydraulic fluid, which may be removed via already present cooling devices.

The controllable operating behavior of the hydraulic energy converter may preferably be instigated by a control unit, for example which is also responsible for initiating, controlling and/or monitoring the operation of the at least one fuel cell. When commissioning the fuel cell system, the control unit could simultaneously or consecutively set the at least one fuel cell to a predetermined operational phase by opening the first inlet to supply the fuel, opening the second inlet to supply the oxidant, and establishing an electrical connection with the electrically drivable hydraulic pump, at the same time as the hydraulic energy converter. For example, the latter could be set so as to allow the hydraulic pump to start. With the hydraulic pump in operation, the operating behavior of the energy converter could then be influenced in such a way as to generate a higher hydraulic power loss, until the hydraulic pump requires the type of electrical power that is equivalent to the desired mass flow of water and/or oxygen-depleted air. The hydraulic energy converter may here encompass a second operational phase, for example.

A special advantage to the fuel cell system according to an embodiment of the invention lies in the simple structural design and low system complexity. Even with a compact hydraulic pump, very high hydraulic power levels may be achieved, which result in a high electrical power consumption. As a consequence, the fuel cell system as a generator for oxygen-depleted air and/or water may be reliably operated continuously and at a high power.

In an advantageous embodiment, the hydraulic energy converter comprises a flow screen with an adjustable opening cross section and an actuator that adjusts the opening cross section. The flow screen connects the high-pressure portion and low-pressure portion of the hydraulic network, and the hydraulic liquid flows through the screen at a rate depending on the open cross section and pressure difference, with a turbulence forming upstream and downstream from the opening edges of the opening cross section. The flow screen here creates a local flow resistance that abruptly narrows the line cross section, and in the process converts hydraulic power into heat. The operating behavior of flow screens is sufficiently known, and flow screens along with their adjustment mechanisms may be deemed sophisticated. As a consequence, the use of one or more flow screens connected in parallel or in series represents an especially simple approach toward realizing the energy converter that is reliable and safe.

In a preferred embodiment, the energy converter is arranged downstream from a priority valve, and the other hydraulic load is overridingly supplied with hydraulic fluid. As a consequence, corresponding terminals for hydraulic loads are situated at locations of the hydraulic network that are farther away from the hydraulic pump, so that these loads are supplied overridingly with hydraulic fluid. The proper operation of especially safety-critical loads may thereby be ensured, so as not to detract from the safety of the aircraft. If the energy converter were located upstream from the other hydraulic loads, the concern would be that the latter will be deactivated as soon as the supply of safety-critical loads is placed in jeopardy, for example due to a complete blockage of an opening cross section or the like.

The fuel cell system may further comprise a dispensing opening for selectively dispensing the generated water or generated oxygen-depleted exhaust air into the environment of the aircraft. The goal of this further development is to also be able to use the fuel cell system for preheating the hydraulic network, when there exists no demand for water or oxygen-depleted air. Only a brief operation of the fuel cell system might be required, potentially causing water and/or oxygen-depleted exhaust air to exit the aircraft. However, by coupling the electrically drivable pump with an electrical network on board the aircraft that delivers electrical power, the respective hydraulic network may be preheated even without the at least one fuel cell being in operation. For example, preheating a hydraulic network according to a similar scheme is known from EP 2 160 323 B1.

It is generally conceivable for the generated water to also be routed on board the aircraft in a corresponding tank, from where it is used, for example, for a lavatory or to humidify processed air for the cabin of the aircraft.

It is further also conceivable to store oxygen-depleted air in a pressure tank, so that, if necessary, as high a volume flow of oxygen-depleted air as possible may be routed into the room where a fire is to be extinguished.

It is advantageous for the control unit to be coupled with the hydraulic energy converter, and set up to control the operating behavior of the hydraulic energy converter depending on the electrical power absorbed by the electrically drivable hydraulic pump. This may be accomplished by way of a functional correlation, in predetermined stages or through characteristic control.

It is especially advantageous for a control unit, e.g., one corresponding to the control unit mentioned above, to be set up to initiate the operation of the fuel cell system to increase the temperature of the hydraulic network.

It would be advantageous to monitor a temperature of the hydraulic network and, if the temperature drops below a predetermined value, initiate the operation of the fuel cell system to increase the temperature in the hydraulic network. The mentioned control unit could therefore be set up to correspondingly initiate the operation of the fuel cell system once a temperature has been found to drop below a predetermined value. However, the control unit could also be set up to only put the electrically drivable hydraulic pump into operation, thus rendering the operation of the at least one fuel cell unnecessary. This may be advantageous in particular when the control unit and/or electrically drivable hydraulic pump are not dedicated components of the fuel cell system, but rather are realized with components already present in an aircraft within the framework of a multifunctional approach.

The system may further comprise at least one additional electrical load, which is connectable with the voltage output of the at least one fuel cell. This improves the possibility of providing a sink for electrical power, so that the operation of the fuel cell system will lead to the desired success. The electrical load may be whatever kind desired, and be realized by an actual effectively usable device or a device that exclusively serves to remove electrical power.

In particular, the additional electrical load may be an energy converter, which converts electrical power or energy into another form of power or energy.

It is especially advantageous for the additional electrical load to be a heater, which generates heat while in operation. The latter must correspondingly be dissipated into the environment.

In particular if designed as a heater, the additional electrical load is especially preferably located in a ram air duct of the aircraft. As a result, air continuously streams around it, and comprises a low enough temperature to absorb heat. The ram air duct may be provided for any systems desired, for example to cool a heat exchanger of an air conditioning system, an oil cooler of an engine, a ram air duct for introducing fresh air in a venting system, or for other purposes.

The additional electrical load may further be located in the ram air duct downstream from a heat exchanger. As a result, the thermal output by the heat exchanger may be ensured. This prevents any impairment to its operation, in particular due to an additional heat load in the ram air duct.

The invention further relates to a method for operating a fuel cell system, which in particular involves the steps of coupling at least one fuel cell with a hydraulic pump, actuating a hydraulic energy converter arranged in a hydraulic network, and dispensing water and/or oxygen-depleted air through the at least one fuel cell. The method may further involve the step of operating an additional electrical load to increase the power output of the at least one fuel cell.

In addition, the invention relates to an aircraft with a fuselage and at least one room formed therein, as well as a fuel cell system with the features mentioned above. This makes it possible to produce oxygen-depleted air, which may inertize the room or extinguish a fire developing therein.

To this end, the electrically drivable hydraulic pump may be arranged in an emergency hydraulic network. The emergency hydraulic network does not necessarily have to be operated only in an emergency situation, but may also perform functions required for aircraft operation even with the aircraft in a normal state. In the event of an emergency, precisely this emergency hydraulic network may serve to perform primary, hydraulics-based functions.

BRIEF DESCRIPTION OF THE DRAWINGS

Additional features, advantages and possible applications of the present invention may be gleaned from the following description of exemplary embodiments and the figures. All described and/or graphically illustrated features here comprise the subject matter of the invention, whether taken in isolation or in any combination, even independently of their composition in the individual claims or back references thereto. Furthermore, identical reference numbers on the figures stand for the same or similar objects.

DETAILED DESCRIPTION

Figure 1:
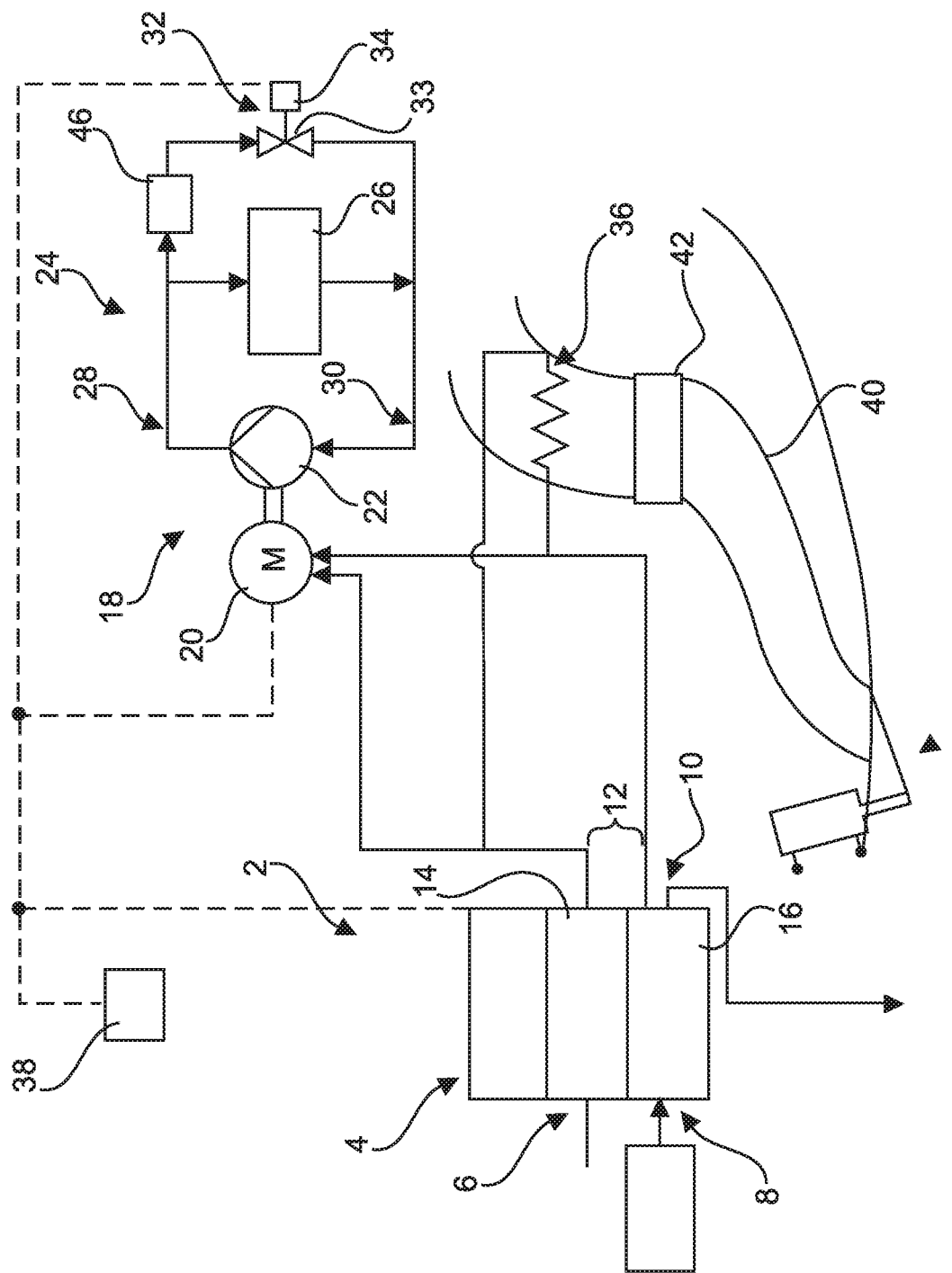
FIG. 1 shows a fuel cell system in a block-based, schematic depiction.

FIG. 1 shows a fuel cell system 2 with a fuel cell stack 4 comprised of at least one fuel cell 4, which comprises a first inlet 6 for a fuel, a second inlet 8 for an oxidant, and an outlet 10 for exhaust air. Also present is a voltage output 12, which is connected both with an anode side 14 and a cathode side 16. The first inlet 6 is situated on the anode side 14, and delivers hydrogen or a hydrogen-containing gas to the fuel cell stack 4. While using a reformer or reactor for converting jet fuel into a hydrogen-containing gas might be sufficient for a hydrogen-containing gas, a sufficient volume flow of pure hydrogen may only be provided from a storage device. Aside from cryogenic storage technology, pressure accumulators and metal hydride accumulators are also possible. Air is passed through the second inlet 8. The reaction between the hydrogen and oxygen generates heat, electricity and oxygen-depleted air, as well as water, which is present in the oxygen-depleted exhaust air in particular as water vapor. If the fuel cell system is to serve exclusively for producing water, oxygen from an oxygen accumulator may also be used.

Continuously implementing the fuel cell process requires that electrical power be tapped from the fuel cell stack 4. Provided in the fuel cell system 2 according to an embodiment of the invention for this purpose is an electrically drivable hydraulic pump 18, which comprises an electric motor 20 and a pump unit 22. For example, the latter may be an axial piston pump with a constant or variable angle of a swash plate. The pump unit 22 is connected with a hydraulic network 24, which incorporates hydraulic loads 26. The latter are connected with a high-pressure branch 28 and a low-pressure branch 30.

Let it be noted in this conjunction that in particular single-aisle aircraft manufactured by AIRBUS have three hydraulic systems, which are designated as a green, yellow and blue system. While the green and yellow system are each supplied with pressure by engine-driven hydraulic pumps, the blue hydraulic system comprises an electrically drivable hydraulic pump along with a hydraulic pump driven by a ram air turbine (RAT, ram air turbine). While the hydraulic pump 18 may be integrated into one of the yellow or green hydraulic systems, it may be beneficial to integrate it into the blue hydraulic system, since the electrically drivable hydraulic pump present there may be coupled with the fuel cell stack 4. In other aircraft models, the hydraulic system designations may differ, and it is further possible to integrate or use an electrically drivable hydraulic pump in one of two primary hydraulic networks.

In order to achieve a sufficient power output, use is made of a hydraulic energy converter 32, for example one designed as a flow screen, which comprises an actuator 34 for adjusting the opening cross section 33. In the case shown, the latter is downstream from a prioritization valve 46, which ensures that the hydraulic loads 26 are preferably supplied with hydraulic liquid and pressure. Reducing the flow cross section in the energy converter 32 makes it possible to increase the absorbed power of the pump unit 22, so that the electric motor 20 has to be supplied with more electrical power. This ensures that the fuel cell stack 4 provides enough oxygen-depleted exhaust air and/or water owing to the continuously high power demand. This would be impossible without a power output to the electric motor 20.

In order to increase the electrical power to be applied even more, an additional electrical load 36 may be used, e.g., in the form of a heater, in a ram air duct 40 that may be sealed by way of a flap 41, for example. As an example, the additional electrical load 36 could be used downstream from a heat exchanger 42, which is situated in the ram air duct 40 for dissipating heat. The heat exchanger 42 is thus not impeded by the heat emitted by an additional electrical load 36. If the ram air duct 40 is a dedicated, separate ram air duct or does not have to be cooled by the heat exchanger 42, the ram air duct may be sealed by the flap 41 when the fuel cell 4 is not in operation.

A control unit 38 is coupled with the at least one fuel cell 4, the electrically drivable hydraulic pump 18 and the hydraulic energy converter 32, and set up to put the fuel cell 4 followed by the hydraulic pump 18 into operation, in particular given a demand for oxygen-depleted air, and to actuate the hydraulic energy converter 32 in such a way as to achieve a sufficient electrical power output by the fuel cell 4. This makes it possible to put out a high volume flow of oxygen-depleted air having a high enough quality.

All in all, the fuel cell system 2 may reliably provide oxygen-depleted exhaust air and/or water with no great outlay, without requiring any serious modifications to the aircraft.

Figure 2:
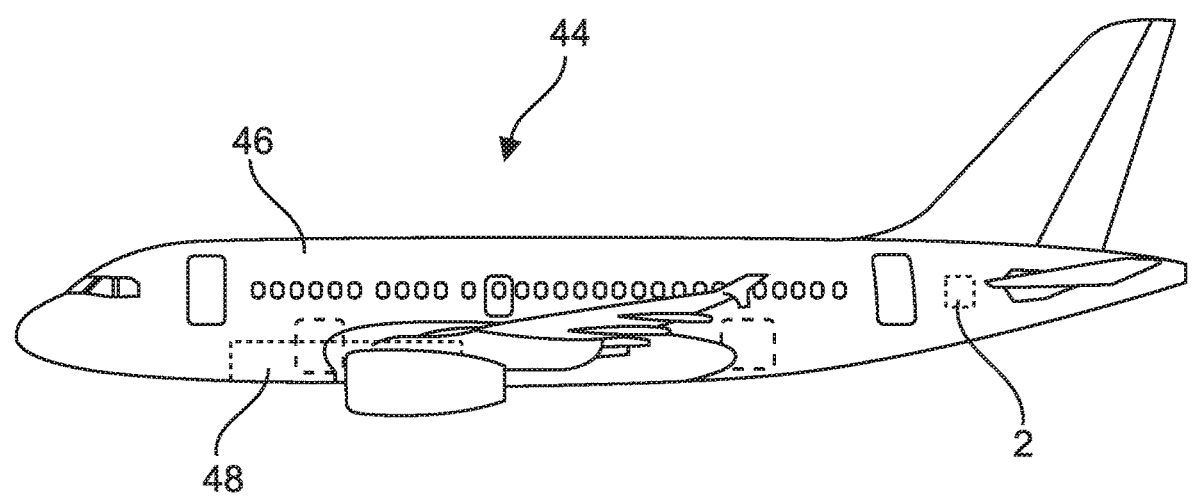
FIG. 2 shows an aircraft with a fuselage, a room created therein, and a fuel cell system in a schematic side view.

FIG. 2 presents a schematic side view of an aircraft 44, which comprises a fuselage 46 with a room 48 formed therein, for example one designed as a cargo hold. While the fuel cell system 2 is exemplarily arranged in an unpressurized area, this is in no way to be construed as a limitation. It may make just as much sense to arrange it in a pressurized area of the fuselage 46. The fuel cell system 2 may be coupled with the room 48, so that oxygen-depleted air may be introduced into the room 48 in the event of a fire or for inertization purposes.

Let it further be noted that "comprise" does not preclude any other elements or steps, and that "a" or "an" does not rule out a plurality. In addition, let it be noted that features described with reference to one of the above exemplary embodiments may also be used in combination with other features of other exemplary embodiments described above. Reference numbers in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fuel cell system for an aircraft, the fuel cell system comprising:
    at least one fuel cell with a first inlet for supplying a fuel, a second inlet for supplying an oxidant, an outlet for removing exhaust air, and a voltage output;
    an electrically drivable hydraulic pump integratable into a hydraulic network of the aircraft, and connectable with the voltage output of the at least one fuel cell; and
    a controllable hydraulic energy converter with variable operating behavior, the controllable hydraulic energy converter arranged between a high-pressure side and a low-pressure side of the hydraulic network,
    wherein the hydraulic energy converter is set up to generate the type of power demand in the hydraulic network that the fuel cell dispenses electrical power to the hydraulic pump to provide a prescribed volume flow of oxygen-depleted exhaust air to the outlet.

2. The fuel cell system according to claim 1, wherein the hydraulic energy converter comprises a flow screen with an adjustable opening cross section and an actuator that adjusts the opening cross section.

3. The fuel cell system according to claim 1, wherein the hydraulic energy converter is arranged downstream from a priority valve configured to overridingly supply other hydraulic loads with hydraulic fluid.

4. The fuel cell system according to claim 1, further comprising at least one dispensing opening for dispensing the generated water or generated oxygen-depleted exhaust air into the environment of the aircraft.

5. The fuel cell system according to claim 1, further comprising a control unit coupled with the hydraulic energy converter and set up to control the operating behavior of the hydraulic energy converter depending on the electrical power absorbed by the electrically drivable hydraulic pump.

6. The fuel cell system according to claim 5, wherein the control unit is set up to elevate the operation of the fuel cell system to increase the temperature of the hydraulic fluid in the hydraulic network if the temperature drops below a predetermined value.

7. The fuel cell system according to claim 1, further comprising at least one additional electrical load connectable with the voltage output of the at least one fuel cell.

8. The fuel cell system according to claim 7, wherein the additional electrical load is an energy converter.

9. The fuel cell system according to claim 8, wherein the additional electrical load is a heater.

10. The fuel cell system according to claim 8, wherein the additional electrical load is located in a ram air duct of the aircraft.

11. The fuel cell system according to claim 9, wherein the additional electrical load is located in the ram air duct downstream from a heat exchanger.

12. An aircraft comprising a fuselage, at least one room formed therein, and a fuel cell system according to claim 1 wherein the outlet is coupled with the at least one room, so as to inertize the at least one room or extinguish a fire developing therein.

13. The aircraft of claim 12, wherein the electrically drivable hydraulic pump is arranged in an emergency hydraulic network.

14. The fuel cell system according to claim 1, wherein the hydraulic energy converter is configured to convert hydraulic power into heat.

* * * * *